(12) United States Patent
Sasser et al.

(10) Patent No.: US 7,594,766 B1
(45) Date of Patent: Sep. 29, 2009

(54) INTEGRATED OPTICAL TRANSCEIVER ARRAY

(75) Inventors: Gary Dean Sasser, San Jose, CA (US); Chris Kiyoshi Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 596 days.

(21) Appl. No.: 10/715,576

(22) Filed: Nov. 17, 2003

Related U.S. Application Data (60) Provisional application No. 60/426,546, filed on Nov. 15, 2002.

(51) Int. Cl.
*G02B 6/36* (2006.01)
*G02B 6/42* (2006.01)

(52) U.S. Cl. .............................. 385/89; 385/92; 385/139
(58) Field of Classification Search .................. 385/88, 385/92, 76, 89
See application file for complete search history.

(56) References Cited

U.S. PATENT DOCUMENTS

| | | | |
|---|---|---|---|
| 6,305,848 B1 | 10/2001 | Gregory | |
| 6,358,066 B1 | 3/2002 | Gilliland et al. | |
| 6,364,534 B1 * | 4/2002 | Lampert | 385/53 |
| 6,419,399 B1 | 7/2002 | Loder et al. | |
| 6,478,472 B1 * | 11/2002 | Anderson et al. | 385/53 |
| 6,517,382 B2 | 2/2003 | Flickinger et al. | |
| 6,533,470 B2 * | 3/2003 | Ahrens | 385/88 |
| 6,692,159 B2 * | 2/2004 | Chiu et al. | 385/53 |
| 6,789,958 B2 * | 9/2004 | Ahrens et al. | 385/92 |
| 6,851,867 B2 | 2/2005 | Pang et al. | |
| 6,854,894 B1 * | 2/2005 | Yunker et al. | 385/53 |
| 6,863,446 B2 * | 3/2005 | Ngo | 385/72 |
| 7,118,281 B2 * | 10/2006 | Chiu et al. | 385/53 |
| 2003/0012485 A1 | 1/2003 | Neeley et al. | |
| 2003/0021552 A1 | 1/2003 | Mitchell | |
| 2003/0044129 A1 | 3/2003 | Ahrens et al. | |
| 2003/0142917 A1 | 7/2003 | Merrick | |
| 2004/0062486 A1 * | 4/2004 | Tanaka et al. | 385/55 |

OTHER PUBLICATIONS

Co-pending U.S. Patent Application to Gary Dean Sasser and Chris Kiyoshi Togami, U.S. Appl. No. 10/716,149, filed Nov. 17, 2003 (29 pages), and 9 sheets of accompanying drawings.

* cited by examiner

*Primary Examiner*—Michelle R Connelly Cushwa
(74) *Attorney, Agent, or Firm*—Workman Nydegger (57) ABSTRACT

An integrated array for optoelectronic components in an optical communications system is disclosed. The integrated array incorporates a plurality of optoelectronic modules, such as optical transceivers, in a compact, integrated geometry for positioning within an optical device, such as an optical switch or router. In one embodiment, the integrated array includes a component structure comprised of a plurality of optical transceiver sub-modules, each having dual optical ports. The component structure is integrated as a single structure to minimize the spacing between each transceiver sub-module. This in turn increases the optical port density of the integrated array. The integrated array is received by a cage that is attached to a host board within the optical device. A latching mechanism is included to selectively secure the integrated array within the cage.

30 Claims, 9 Drawing Sheets

INTEGRATED OPTICAL TRANSCEIVER ARRAY

CROSS-REFERENCE TO RELATED APPLICATIONS

This application claims the benefit of U.S. Provisional Application No. 60/426,546, filed Nov. 15, 2002, which is incorporated herein by reference in its entirety.

BACKGROUND OF THE INVENTION

1. The Field of the Invention

The present invention generally relates to optoelectronic modules, including optical transceiver modules. More particularly, the present invention relates to an integrated optoelectronic module array system for minimizing the amount of space required in positioning such apparatus within an optical device.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal (containing digital information or other data) from a network device, such as a computer, and converts the electrical signal via a laser and related components to a modulated optical signal. The optical signal can then be transmitted in a fiber optic cable via the optical communications network to a reception node of the network. Upon receipt by the reception node, the optical signal is fed to another optical transceiver that uses a photodetector and related components to convert the optical signal back into electrical signals. The electrical signals are then forwarded to a host device, such as a computer, for processing. The optical transceivers described above have both signal transmission and reception capabilities; thus, the transmitter portion of an optical transceiver can convert an incoming electrical signal into an optical signal, while the receiver portion of the transceiver can convert an incoming optical signal into an electrical signal.

In a typical transceiver, the components responsible for transmitting and receiving optical signals are located in a transmitting optical sub assembly ("TOSA") and a receiving optical sub assembly ("ROSA"), respectively. Specifically, the laser and associated components for producing an optical signal are located in the TOSA, while the photodetector and related components for receiving an optical signal are located in the ROSA. Optical signals are introduced to the ROSA and emitted from the TOSA via two respective optical ports defined in the optical transceiver module. The optical ports are typically arranged to be side-by-side when the bottom surface of the transceiver module is mounted within a device.

Various optical devices employ a plurality of optical transceivers to perform the optical transmission and reception operations described above. For instance, optical devices such as switches and optical routers position a plurality of optical transceiver modules together within the device to enable several optical signal channels to be processed simultaneously. The plurality of optical transceivers are typically placed side-by-side along one or more edges of a host board within the device.

An ever-present goal exists in the art to increase the number of optical ports available when implementing fiber optic systems. This goal extends to optical devices, such as optical switches, routers, and similar devices that utilize optical transceiver modules and other optoelectronic devices having such optical ports.

Though optical transceiver design is largely governed by multi-source agreements ("MSAs"), such as the SFP and XFP MSA standards, which determine the physical dimensions of such modules, it has nonetheless been desirable in the past to reduce the amount of space occupied by the transceiver modules in order to increase optical port density. This is typically achieved in known designs by packing adjacent optical transceiver modules in close proximity to one another on the host board of the optical device and mounting the bottom surfaces of each module to the host board. However, this method alone results in only partial success in increasing optical port density.

In a further effort to increase the optical port density of multiple optical transceiver modules, some known optical device designs mount the bottom surfaces of a first row of adjacent transceiver modules to an upper surface of the host board, and the bottom surfaces of a second row of adjacent transceivers to the host board lower surface. While this configuration can also improve transceiver module density, it nonetheless substantially improves neither inter-module spacing of adjacent transceiver modules nor corresponding optical port density.

In light of the above discussion, a need exists for an optical transceiver module array that overcomes the above challenges. In particular, implementations and methods are sought by which optical transceiver modules can be positioned so as to maximize the density of optical ports of the transceiver modules within an optical device.

BRIEF SUMMARY OF THE INVENTION

The present invention has been developed in response to the above and other needs in the art. Briefly summarized, embodiments of the present invention are directed to an integrated optoelectronic module array for use in optical devices and other environments. The integrated module array of the present invention is configured to increase the density of the optoelectronic modules, such as optical transceiver modules, within the optical device, thereby correspondingly increasing the density of optical ports per unit dimension within the optical device. This results in reduced space requirements within the optical device, and also enables the employment of relatively larger numbers of optical transceiver modules and corresponding optical ports per unit dimension within the optical device or other environment.

In one embodiment, the present integrated module array is composed of various components, including a housing partially containing an integrated component structure, and a latching mechanism. The integrated component structure is composed of a plurality of optoelectronic sub-modules that are combined into a single structure. In one embodiment, the integrated component structure includes a plurality of optical transceiver sub-modules, each having dual optical ports. Though combined with other sub-modules within the integrated component structure, each optical transceiver sub-module operates independently in transmitting and receiving optical signals via its respective dual optical ports.

The housing and integrated component structure of the integrated module array are in turn contained within an outer cage, which provides shielding from electromagnetic interference. The latching mechanism of the integrated module array selectively secures the array to the outer cage, which is correspondingly affixed to a host board. In turn, the host board can be contained within an optical device, such as an optical switch or router.

The integration of the optical transceiver sub-modules into the integrated component structure maximizes the number of transceivers than can be included within the optical device. This in turn desirably corresponds to an increased density of optical ports for a given space. Multiple integrated module arrays can be included in an optical device, and the number of sub-modules that can be included in the sub-module structure of the integrated module array can vary according to system design and needs. Further, sub-modules of different types and purposes can be included in the same or adjacent integrated module arrays within an optical device, if desired.

In sum, the configuration described above minimizes inter-module spacing of the optoelectronic devices utilized within the integrated module array. As a result, optical port density can be increased, which leads to greater signal transfer capacity, smaller optical device sizes, or both, in the case of optical transceiver components. Reduced EMI emissions from the various transceiver sub-modules that comprise the integrated array can also be realized by practice of the present invention, owing to the integrated physical nature of the array.

In one embodiment, release sleeves are employed in connection with optical fiber connectors that pluggably interface with each sub-module of the integrated module array. This allows for ready insertion and removal of the connector from the respective sub-module despite the reduced spacing between adjacent sub-modules in the array.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-6B depict various features of embodiments of the present invention, which is generally directed to an integrated optoelectronic component array for use in optical devices, including optical switches, optical routers, and the like. The integrated optoelectronic component array of the present invention maximizes the placement of optoelectronic components, such as optical transceivers, within the optical device, thereby leading to a net increase in optical port density, in the case of optical transceivers. Though the discussion to follow will describe embodiments of the integrated optoelectronic component array as including optical transceiver components, the scope of this invention is not so limited. Consequently, while embodiments of the present integrated optoelectronic array can be configured to include optical transceiver components, the present invention can also be adapted for use with optoelectronic components of a variety of types.

Figure 1:
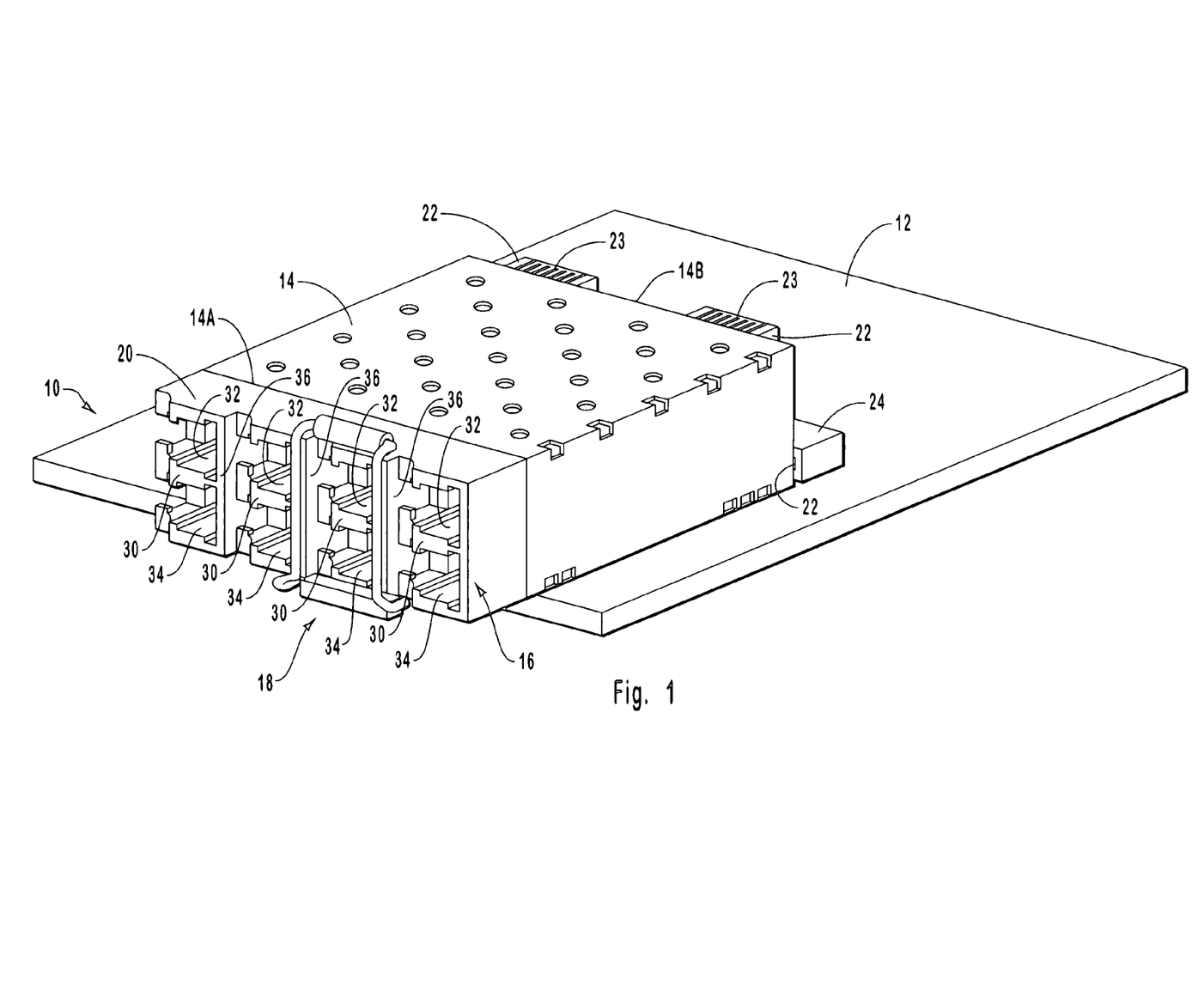
FIG. 1 is a perspective view of an integrated module array in accordance with one embodiment of the present invention.

Reference is first made to FIG. 1, which shows one embodiment of the present invention. In particular, FIG. 1 shows an integrated optoelectronic component array ("integrated array"), generally designated at 10. The integrated array 10 is shown mounted to a host board 12. The host board 12 can be contained within an optical device (not shown), such as an optical switch, optical router, or the like. However, the present invention can be practiced in other environments as well.

As shown in FIG. 1, the integrated array 10 in one embodiment is composed of various components, including an integrated component structure 16, and a latching mechanism 18. These components are received within an outer cage 14. In the present embodiment, the outer cage 14 is composed of a suitable material, such as a metallic material, that enables the cage to serve as an electromagnetic interference ("EMI") shield for the integrated array 10. In addition, the outer cage 14 provides a covering for the integrated array 10 to protect interior portions thereof. Also, the outer cage 14 mounts to a surface of the host board 12 to provide a fixed location within which the integrated array 10 can be received. The size of the outer cage 14 can be scalable in different embodiments to accommodate component structures of different sizes, as will be discussed.

The outer cage 14 includes a first end 14A, a second end 14B, and is sized to partially contain the component structure 16. In detail, FIG. 1 shows the component structure 16 partially contained within the outer cage 14, wherein an optical interface portion 20 of the component structure 16 extends from the first end 14A of the outer cage 14. The latching mechanism 18 attaches to optical interface portion 20 and is utilized to selectively secure the integrated array 10 to the host board 12.

The component structure 16 is composed of a plurality of optoelectronic components for use by the optical device. In one embodiment, the plurality of optoelectronic components is arranged into multiple sub-modules that are closely arranged in the component structure 16. This can be seen in FIG. 1, wherein four optical transceiver sub-modules 30 are formed in the component structure. The transceiver sub-modules 30 can be integrated into a single structure, as shown in FIG. 1. Alternatively, the transceiver sub-modules 30 can be separately formed then arranged together in a dense configuration in the component structure 16. A front portion of each transceiver sub-module 30 defines a portion of the optical interface portion 20 that extends from the first end 14A of the outer cage 14. Though the component structure 16 of the illustrated embodiment shows four sub-modules, it is appreciated that the component structure 16 can be formed from two, three, six, eight, or more sub-modules.

Each transceiver sub-module 30 in FIG. 1 includes two optical ports 32 and 34 that are arranged in a top-over bottom configuration. Viewed together, the optical ports 32 and 34 of the four transceiver sub-modules 30 form a 2×4 optical port array along the face of the optical interface portion 20. It is conceivable, however, that optical port arrays of other sizes (i.e., 1×4, 2×6, 3×5, etc.) can also be configured. The optical ports 32 and 34 of each transceiver sub-module 30 in FIG. 1 correspond to a transmission optical subassembly ("TOSA") and a receiving optical subassembly ("ROSA"), respectively, that are contained within the component structure 16. In other embodiments, however, the optical ports can be arranged in other configurations and positions to correspond to alternative TOSA and ROSA configurations within the component structure.

The component structure 16 is configured to minimize the spacing between the optical ports of the sub-modules included in the structure, thereby increasing optical port density in the integrated array 10 and, by extension, the optical device. This space minimization is partly accomplished in the present embodiment by integrating each sub-module 30 into the single component structure 16. This integration eliminates redundant structure between each transceiver. One redundancy that can be eliminated involves the outer walls that typically define known transceivers. In known optical transceiver grouping configurations, each transceiver is discrete from the other transceivers, and the transceivers are placed adjacent to one another in a side-by-side arrangement such that the outer walls of the transceivers are adjacent one another. Here, in contrast, each transceiver sub-module 30 of the component structure 16 shares at least one wall, such as the walls 36, with an adjacent sub-module in the component structure. In the present embodiment, each wall 36 is integrally formed as a portion of the component structure 16 and can extend the length of the component structure to provide any necessary interior component separation and/or EMI shielding that can be necessary. Alternatively, the walls 36 can be shortened, lengthened, or shaped as may be desired to provide the proper structure and function of the integrated array 10.

Additional space minimization is realized in the present embodiment of the integrated array 10 via the use of a single latching mechanism for the integrated array 10. In particular, the latching mechanism 18 enables the entire integrated array 10 to be selectively removed and replaced on the host board 12. The use of a single latching mechanism for the selective placement of multiple transceiver sub-modules eliminates the need for separate latching mechanisms for each transceiver, as in known transceiver implementations, thereby reducing the space requirements for the integrated array even further. This feature, along with the integration of each transceiver sub-module as discussed above can, in one embodiment of an integrated array having four transceiver sub-modules, result in space savings of about nine millimeters per integrated array. As mentioned, this also results in a relatively higher optical port density than what is possible in typical transceiver implementations.

Note again that the inclusion of optical transceiver sub-modules in the integrated array is merely an example of the broader principles taught by the present invention. Indeed, one of a variety of optoelectronic components can alternatively be included in the integrated array in place of the transceiver sub-modules. Moreover, it is also possible to include optoelectronic components of different types within the same integrated array, if desired.

A plurality of card portions 22 are shown extending from the second end 14B of the outer cage 14. Each card portion 22 extends from the component structure 16 and can include a card edge connector 23 thereon for electrically interfacing with one or more host boards 12 via a plurality of connector receptacles, one of which is shown mounted on the host board at 24. In turn, the host board 12 can be electrically connected to the host device. In this way, the component structure 16 and the components located therein, such as the TOSA and ROSA, can be electrically connected to the host device via the card edge connectors 23, the connector receptacle 24, and the host board 12.

Figure 2:
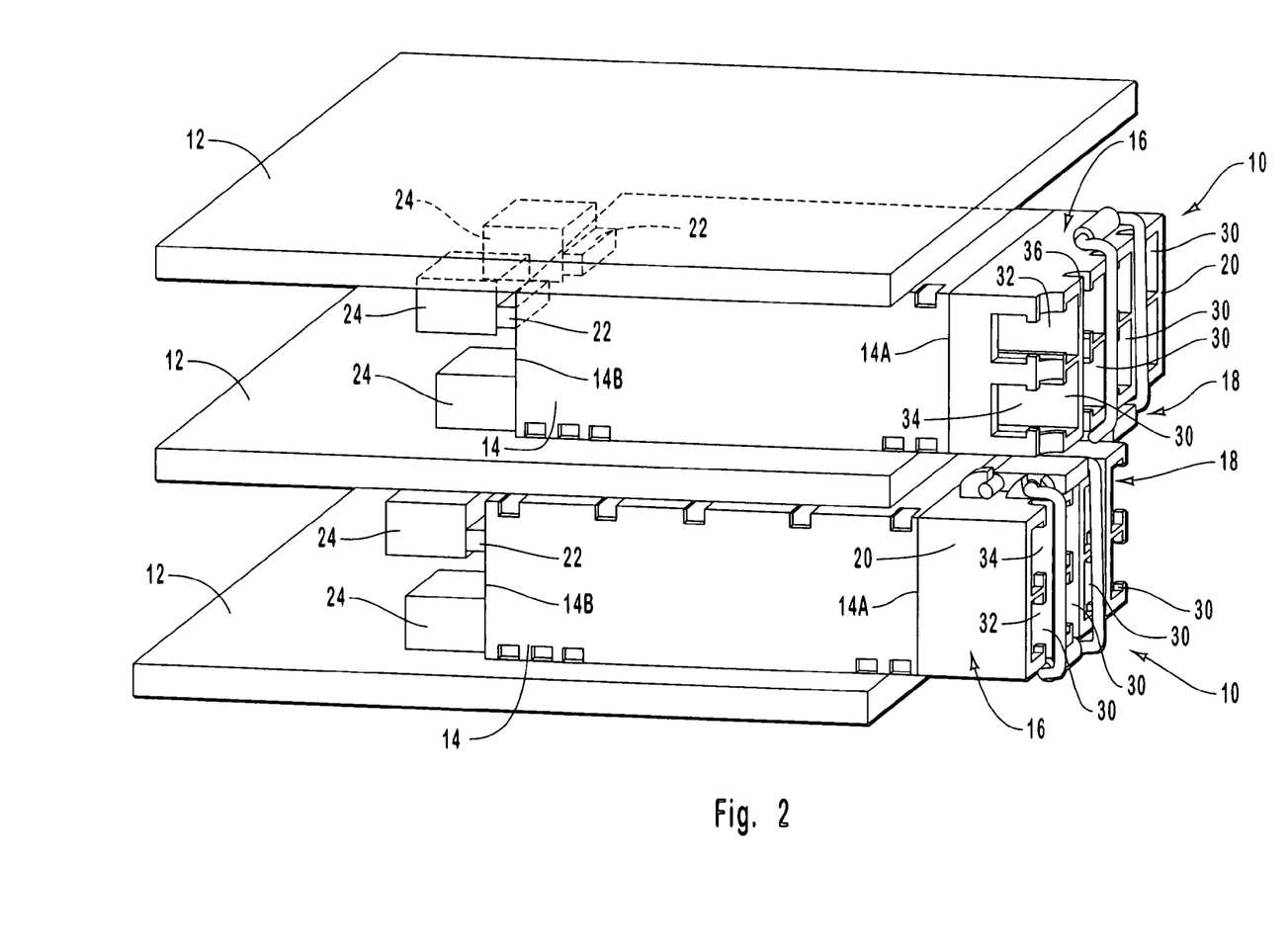
FIG. 2 is a perspective view of dual integrated module arrays configured in accordance with another embodiment of the present invention.

Reference is now made to FIG. 2, which shows a perspective view of one embodiment of the present invention. In detail, FIG. 2 shows two integrated arrays 10 positioned between corresponding host boards 12 in a "belly-to-belly" configuration, which depicts one of a variety of positional configurations that can be used in connection with this invention. As such, the upper integrated array 10 shown in FIG. 2 has the same orientation as the integrated array shown in FIG. 1, while the lower integrated array has an orientation that is rotated 180° about a lengthwise axis of the array from that shown in FIG. 1. Note that the configuration shown in FIG. 2 can be implemented within an optical device, such as an optical switch or router. As such, it is evident that multiple discrete integrated arrays can be combined for use within an optical device. Furthermore, each integrated array can include more or fewer sub-modules that what is shown in the accompanying drawings.

FIG. 2 affords another view of the card portions 22 that extend from the second end 14B of the outer cage 14. As partially shown in FIG. 2, each integrated array 10 here includes four card portions 22 extending from the outer cage 14. The card portions 22 are portions of printed circuit boards (not shown) that are located within the component structure 16. The printed circuit boards in one embodiment include the various components that comprise the TOSAs and ROSAs of each of the transceiver sub-modules 30, which are in turn in operable communication with the optical ports 32 and 34 of the respective sub-module 30. As such, each card portion 22 and card-edge connector 23 is indirectly and operably connected with the optical ports 32 and 34 of one or more of the transceiver sub-modules 30. In one embodiment, for instance, one card portion extends from the integrated array for each corresponding transceiver sub-module. As such, the TOSA and ROSA that pertain to that transceiver sub-module are operably connected to the host board 12 via the respective card portion and card-edge connector located thereon.

The above discussion suggests various possible printed circuit board and card portion configurations. In the illustrated embodiment, two printed circuit boards (not shown) are contained in the component structure 16, with each printed circuit board having two card portions 22 that extend from the second end 14B of the outer cage 14 on the upper integrated array 10 depicted in FIG. 2. As shown, two of these card portions 22 are received into connector receptacles 24 located on an upper host board 12, while the other two card portions are received by connector receptacles 24 positioned on a lower host board. The lower integrated array 10 has a similar configuration. However, in other embodiments other board and card portion combinations are possible such that fewer or more card portions extend from the integrated array 10. Additionally, connection schemes between the host board and the integrated array that are distinct from that explicitly shown and described herein are also possible.

As mentioned, the integrated array of the present invention is scalable to accommodate different numbers of sub-module components. Though the embodiments shown in the accompanying figures depict the integrated array as including four sub-modules, an integrated array can be configured to include two, three, six, or more sub-modules as may be needed for a particular application.

Figure 3A:
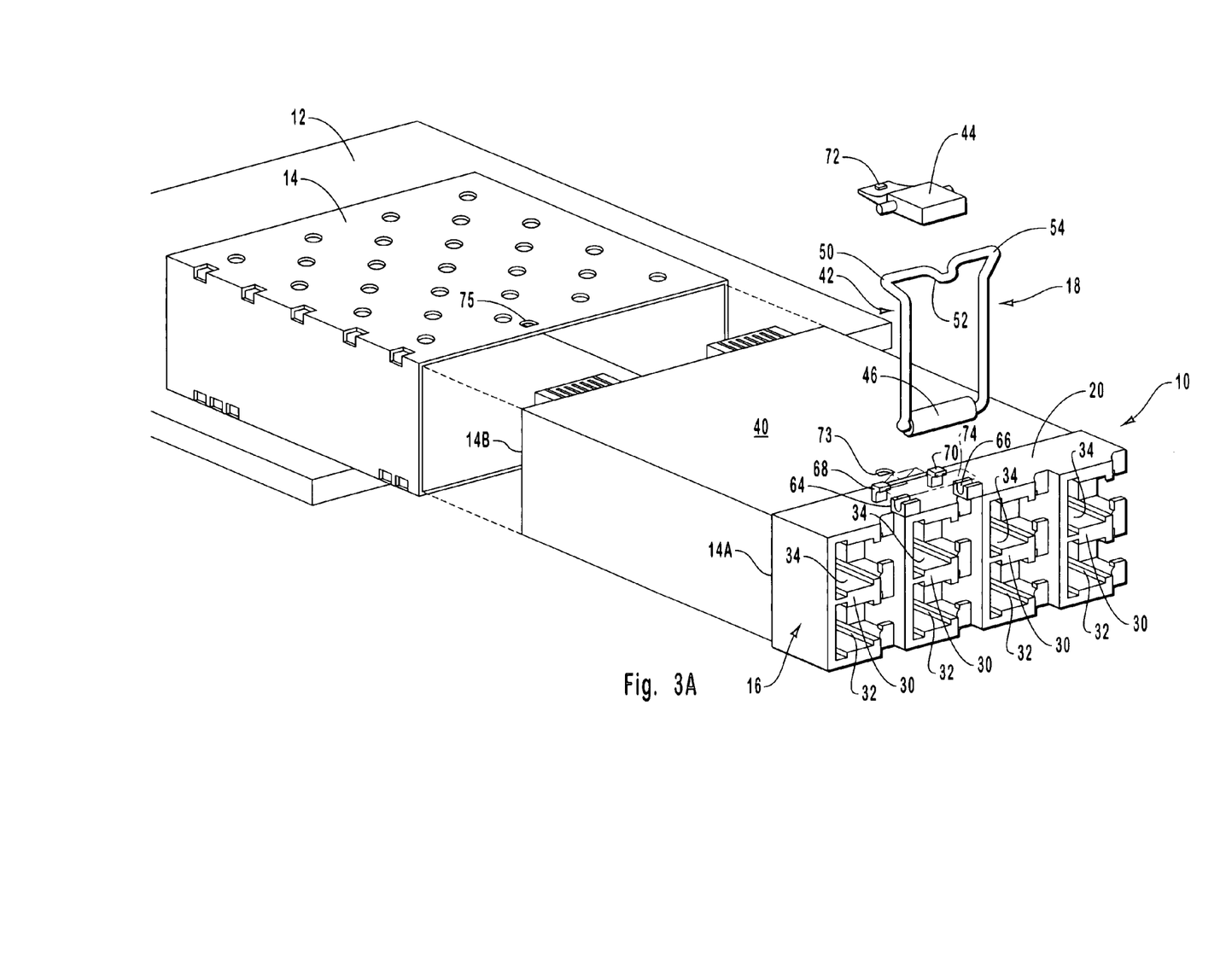
FIG. 3A is a partial exploded view of one embodiment of the integrated module array, including a latching mechanism employed in connection with one embodiment of the present invention.
Figure 3B:
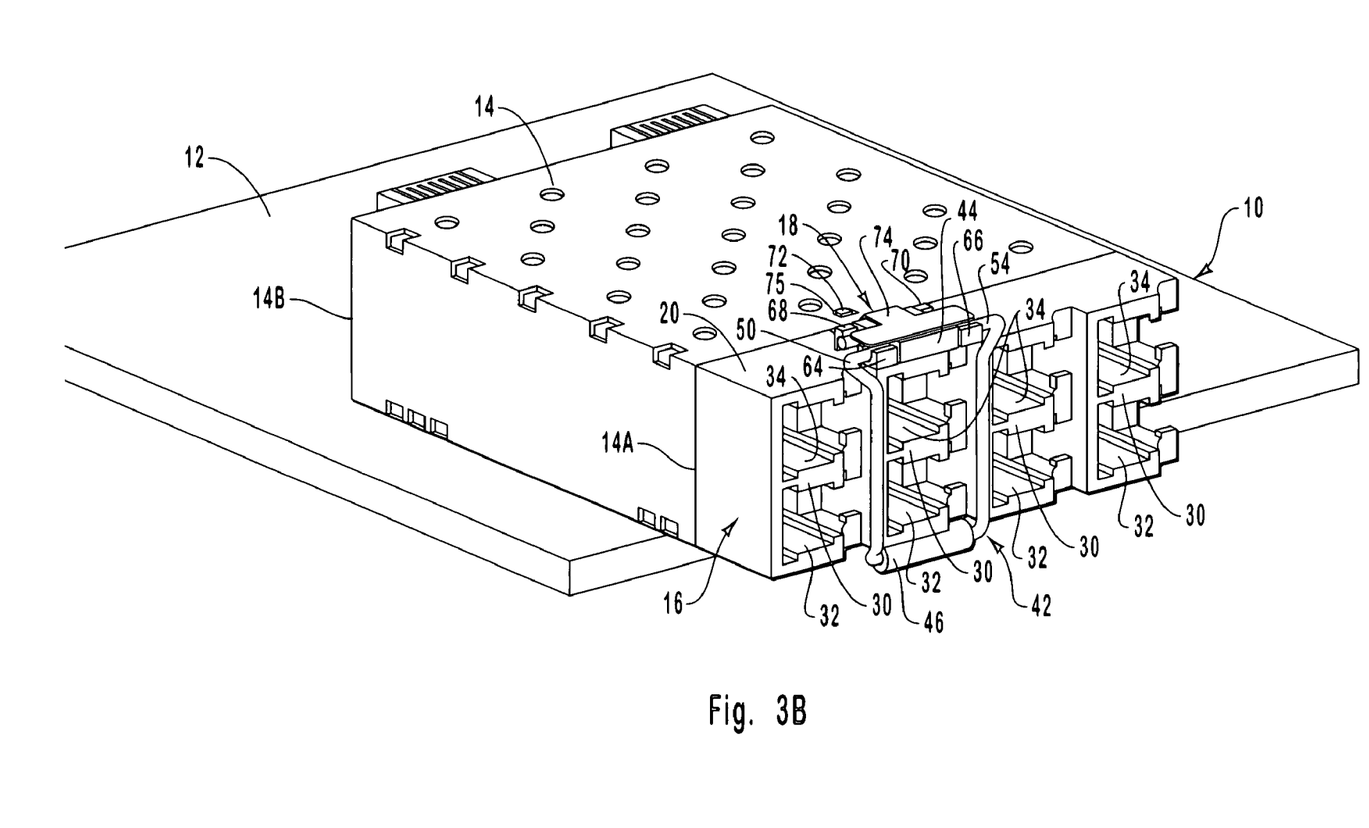
FIG. 3B is an assembled view of the integrated module array and latching mechanism of FIG. 3A.

Reference is now made to FIGS. 3A and 3B, which depict various additional features of the present invention. In detail, FIG. 3A shows the integrated array 10 of FIG. 1 in partial exploded view and rotated 180° about a lengthwise axis of the array. Also shown is the outer cage 14 already described above mounted to the host board 12. (For purposes of illustration an upper host board is not shown). As shown, the component structure 16 is attached to a housing 40 that covers interior components of each sub-module 30. The component structure 16 and housing 40 can be separately or integrally formed.

The latching mechanism 18 of the integrated array 10 is shown in exploded view in FIG. 3A. As mentioned, the latching mechanism 18 is employed to releasably secure the integrated array 10 within the outer cage 14, thereby enabling each transceiver to be selectively inserted into and removed from the outer cage array when desired.

As seen in FIGS. 3A and 3B, the latching mechanism 18 is located on a surface of the optical interface portion 20 of the component structure 16. FIGS. 3A and 3B depict various components of the latching mechanism 18, including a bail 42 and a pivot block 44. The bail 42 in the illustrated embodiment is a shaped piece of rigid wire. The bail 42 has various segments, including a clasp 46, a first shoulder 50, a cam 52, and a second shoulder 54. The bail 42 is shaped as to allow it to operate as a user-actuated portion for inserting and removing the integrated array 10 from the outer cage 14.

The first and second shoulders 50 and 54 of the bail 42 are received into corresponding retention slots 64 and 66 defined on the optical interface portion 20 of the component structure 16 such that the cam 52 is interposed between the retention slots and such that pivoting of the bail 42 about the retention slots can occur. The pivot block 44 is positioned over the cam 52 of the bail 42, and is received into corresponding pivot points 68 and 70 defined on the optical interface portion 20. The pivot block 44 includes a lock pin 72 that movably extends through a hole 73 defined in the housing 40 for releasably engaging a similar hole 75 defined in the outer cage 14. A leaf spring 74, which extends from the housing 40, compressively engages the pivot block 44 to secure the pivot block while enabling it to pivot about the pivot points 68 and 70. In other embodiments, the leaf spring 74 can be defined on and extend from the optical interface portion 20 of the component structure 16.

FIG. 3B shows the latching mechanism 18 as assembled, forming part of the integrated array 10. As noted above, the latching mechanism 18 releasably secures the integrated array 10 in position within the outer cage 14. In detail, FIG. 3B shows the latching mechanism 18 in a latched configuration, wherein the bail 42 is positioned such that the cam 52 thereof causes no pivoting of the pivot block 44 to occur. In this latched configuration, the leaf spring 74 biases the pivot block 44 such that the lock pin 72 extends through the hole 73 defined in the housing 40 and engages the hole 75 in the outer cage 14 when the integrated array is positioned within the outer cage. In other embodiments, however, the latching mechanism can be configured such that the lock pin engages a hole defined in the host board of the optical device in which the integrated array is located.

To disengage the integrated array 10 from the outer cage 14, the bail 42 is pulled in an outward direction. This can be accomplished by a user grasping the clasp 46 and pulling away from the face of the optical interface portion 20 of the component structure 16. This in turn causes the bail 42 to swing out away from the face of the optical interface portion 20. This movement of the bail 42 causes the bail cam 52 to engage the pivot block 44 and pivot it such that the lock pin 72 disengages from the hole 75 in the outer cage 14. After disengagement of the lock pin 72 from the outer cage hole 75, the integrated array 10 can be removed from the outer cage 14 by a pulling force from a user on the clasp 46.

When it is desired to insert the integrated array 10 into the outer cage 14, a user can rotate the bail 42 toward the optical interface portion 20 by grasping the clasp 46 and pushing it in the desired direction. This action disengages the bail cam 52 from the pivot block 44, which readies the lock pin 72 for engagement with the outer cage hole 75. The integrated array 10 can then be inserted into its place within the outer cage 14, at which point the lock pin 72 can engage the hole 75 of the outer cage, thereby locking the integrated array in place. In this way, the integrated array 10 can be selectively and individually inserted into and removed from the optical device as desired. Further details regarding the latching mechanism described herein can be found in U.S. Pat. No. 6,439,918 B1, entitled "Electronic Module Having an Integrated Latching Mechanism," filed Oct. 4, 2001, which is incorporated herein by reference in its entirety. Notwithstanding the above discussion, however, it is appreciated that latching mechanisms having other structures and configurations can also be employed in embodiments of the integrated array. Moreover, a latching mechanism that is employed with the integrated array described herein can be located in locations other than that shown and described above.

Figure 4:
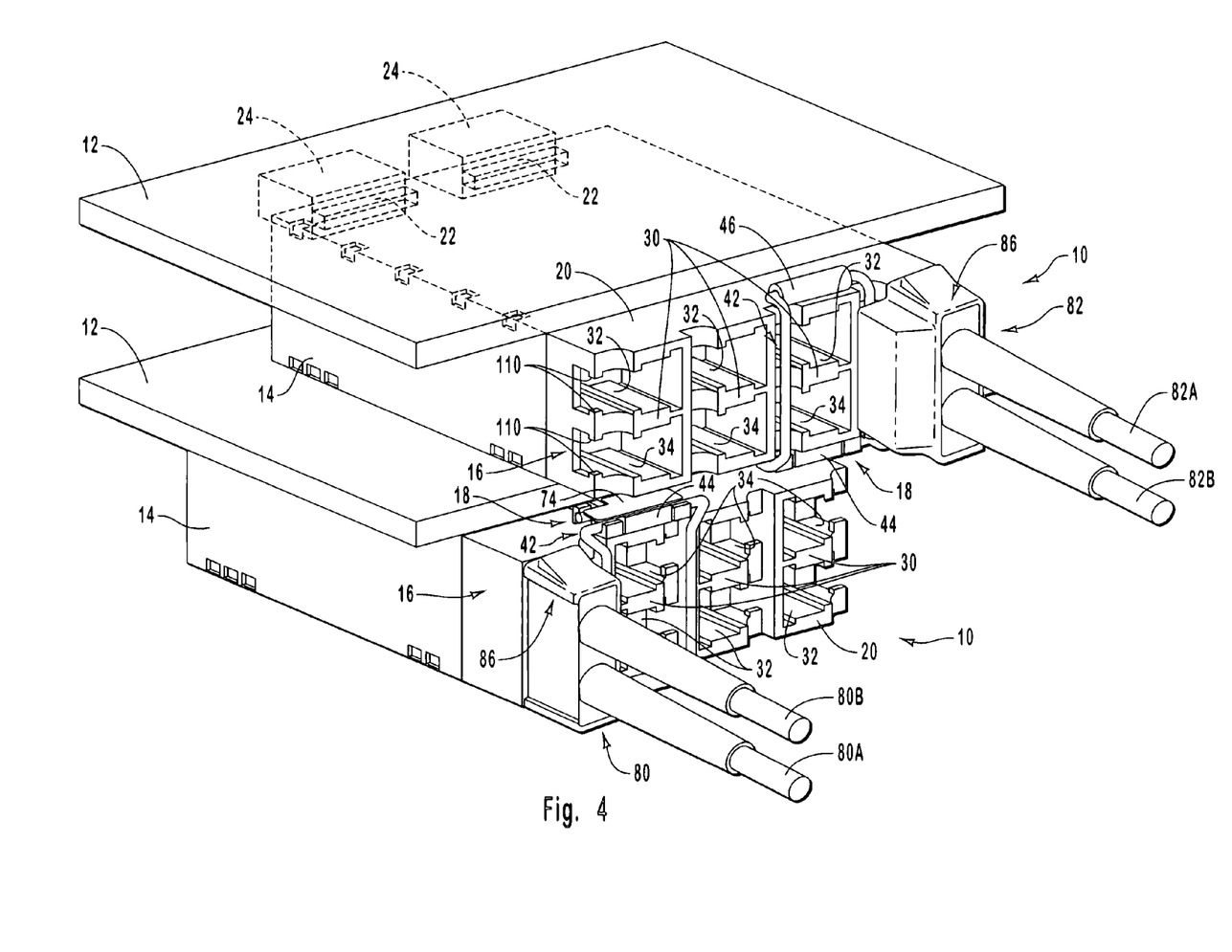
FIG. 4 is a perspective view of dual integrated module arrays having optical fibers connected thereto, in accordance with one embodiment of the present invention.

Reference is now made to FIG. 4. FIG. 4 shows another view of the belly-to-belly arrangement of two integrated arrays 10 that is also depicted in FIG. 2. As already described in connection with FIG. 2, the integrated array 10 is received within the outer cage 14, which in turn is mounted to one or more host boards 12. Each integrated array 10 includes four transceiver sub-modules 30 that are integrally arranged as part of the component structure 16. FIG. 4 additionally shows first and second connectorized optical fibers sets 80 and 82 that are connected with the optical interface portion 20 of the two integrated arrays 10, respectively. In detail, both the first and second connectorized optical fiber sets 80 and 82 are shown coupled with respective transceiver sub-modules 30 of each of the integrated arrays 10 such that first and second optical fibers 80A and 80B of the first optical fiber set are optically coupled with the optical ports 32 and 34 of the respective transceiver sub-module 30 on the lower integrated array in FIG. 4, and such that first and second optical fibers 82A and 82B of the second optical fiber set are optically coupled with the optical ports 32 and 34 of the respective transceiver sub-module 30 on the upper integrated array.

Though only two optical fiber sets are shown connected with the integrated arrays in FIG. 4, it is appreciated that any number, including all of the transceiver sub-modules 30 of each integrated array of FIG. 4 can have optical fiber sets connected thereto.

Each of the first and second connectorized optical fiber sets 80 and 82 includes a standard LC duplex connector 104 that is fitted with a release sleeve 86 that facilitates engagement and disengagement of the optical fiber sets to and from respective transceiver sub-modules 30. Such engagement and disengagement can otherwise be difficult to achieve, given the reduced clearance between the optical ports 32 and 34 of adjacent transceiver sub-modules 30 in the integrated array 10. Thus, the release sleeves 86 facilitate ease of operation with regard to the array system 10.

Figure 5A:
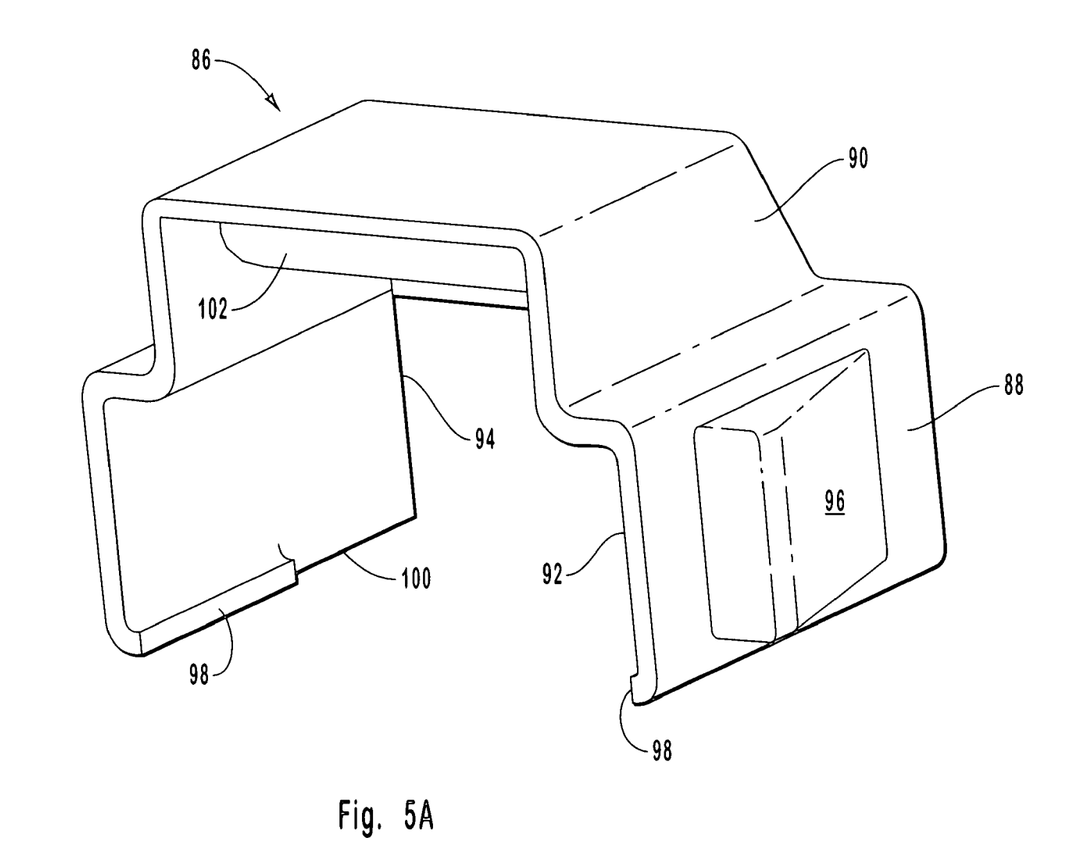
FIG. 5A is a perspective view of one embodiment of a release sleeve employed in connection with the present invention.
Figure 5B:
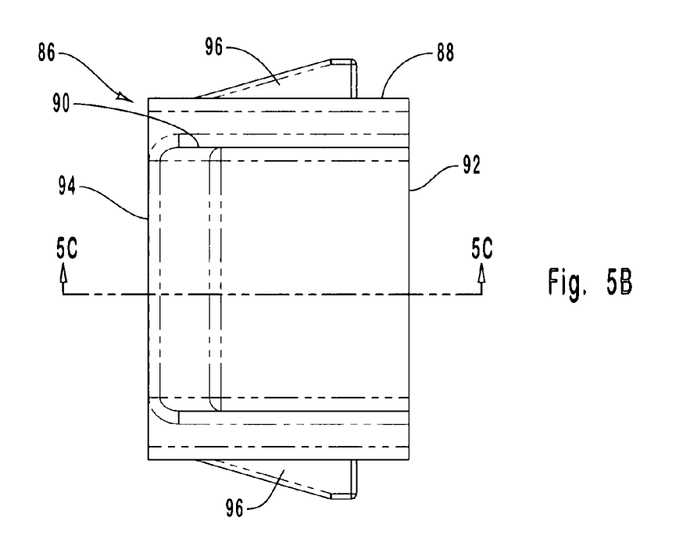
FIG. 5B is a top view of the release sleeve of FIG. 5A.
Figure 5C:
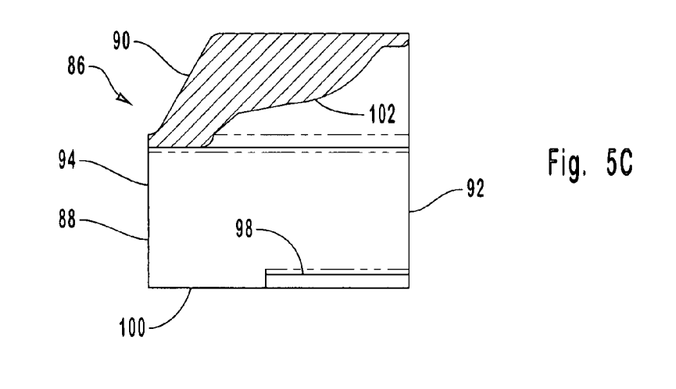
FIG. 5C is a cross sectional side view of the release sleeve of FIG. 5B taken along the lines 5C-5C.

Reference is now made to FIGS. 5A-5C in describing various details regarding the release sleeve 86. In particular, the release sleeve 86 includes a substantially rectangular body 88 having a raised portion 90. In the illustrated embodiment, the raised portion is laterally more narrow than the body 88. The body 88 and raised portion 90 cooperate to define a first open end 92, while the body also defines a second open end 94. The bottom portion of the body 88 is also open. Opposing lateral sides of the body 88 include extended portions 96 to assist in handling the release sleeve 86. Two lips 98 extend inwardly toward one another from a bottom edge 100 of the body 88 for engaging the LC duplex connector 104.

As best seen in FIG. 5C, the raised portion 90 defines a complexly curved top inner surface 102. This curved top inner surface 102 includes both convex and concave curve portions to form a cam surface that is used to selectively engage and disengage the LC duplex connector 104, as will be seen below.

Figure 6A:
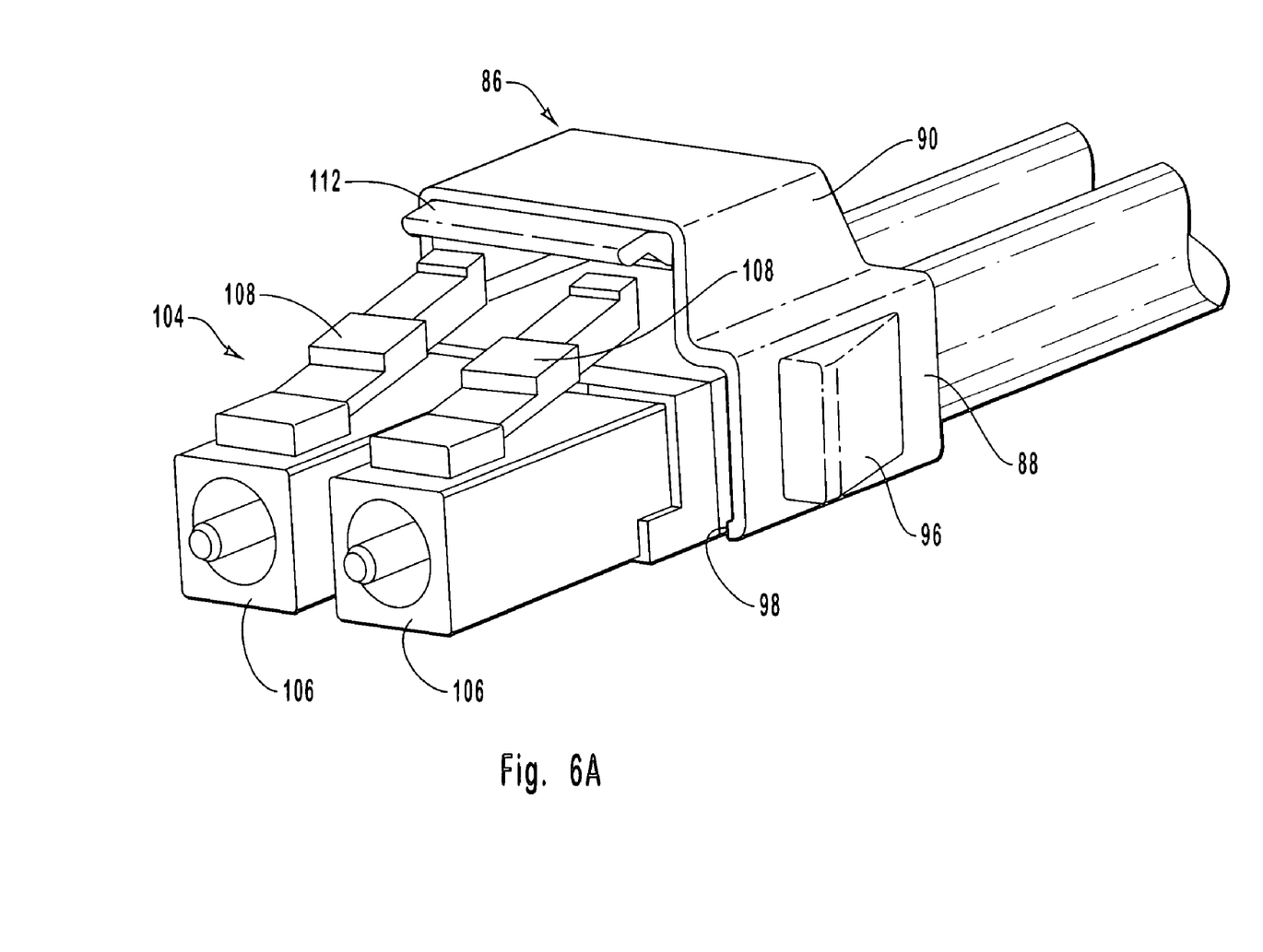
FIG. 6A is a perspective view of an optical fiber connector having the release sleeve of FIGS. 5A-5C slidably connected thereto, wherein the release sleeve is in a disengaged position.

FIG. 6A shows the release sleeve 86 slidably attached to the standard LC duplex connector 104, such as that used in FIG. 4 to optically connect with the optical ports 32 and 34 of one of the transceiver sub-modules 30. The release sleeve 86 in FIG. 6A is shown in a disengaged position that is used when the LC duplex connector 104 is fully coupled with one of the transceiver sub-modules of the integrated arrays 10. In such a coupled position, the LC duplex connector 104 is received by the optical interface portion 20 of the respective component structure 16 such that two connector tips 106 optically couple with the optical ports 32 and 34 of the transceiver sub-module 30. This causes two resilient clips 108 of the LC duplex connector 104 to engage with corresponding notches 110 (FIG. 4) formed on the optical interface portion 20 of the respective component structure 16 to lock the LC duplex connector in a specified position.

As stated, the release sleeve 86 is shown in FIG. 6A in a disengaged position, wherein the release sleeve is slid along the LC duplex connector body in an axial direction away from connector tips 106. This position prevents substantial contact between the curved top inner surface 102 (FIG. 5C) of the release sleeve raised portion 90 and a connector latch 112 of the LC duplex connector 104. Correspondingly, the connector latch 112 is shown disengaged from adjacent ends of each resilient clip 108. This configuration ensures that a secure fit between the optical ports 32 and 34 of the respective transceiver sub-module 30 and the LC duplex connector 104 is achieved.

Figure 6B:
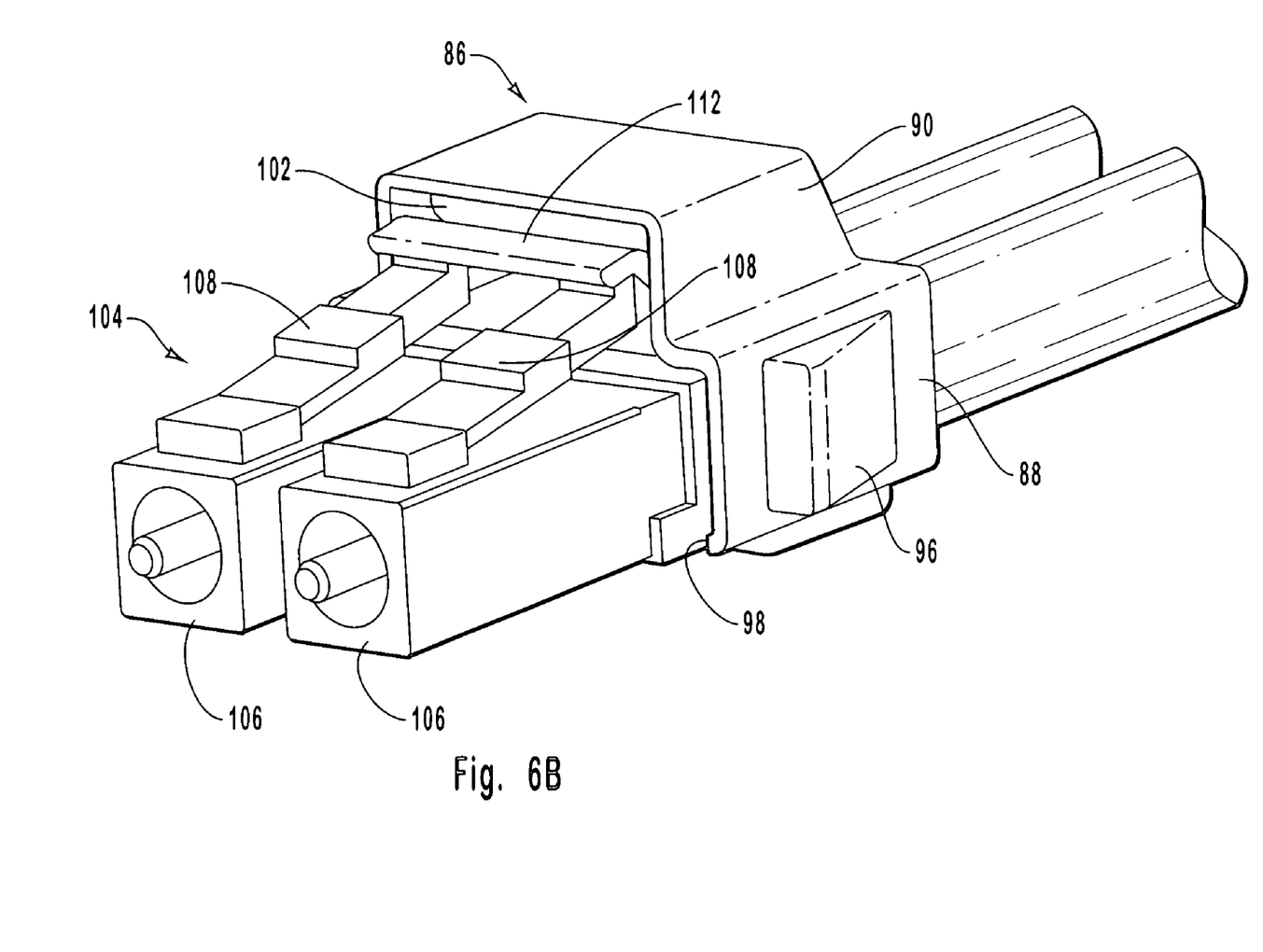
FIG. 6B is a perspective view of the optical fiber connector and release sleeve of FIG. 6A, wherein the release sleeve is in an engaged position.

In contrast, FIG. 6B shows the release sleeve in an engaged position, which is used to retract the LC duplex connector 104 from engagement with the respective transceiver sub-module 30 of the integrated array 10. This position is achieved by sliding the release sleeve 86 along the LC duplex connector body in an axial direction toward the connector tips 106. This axial movement causes the curved top inner surface 102 of the release sleeve raised portion 90 to engage the connector latch 112 and force it into contact with each resilient clip 108 of the LC duplex connector 104. The resilient clips 108 in turn are forced downward to disengage each clip from the notches 110 (FIG. 4) of the respective transceiver sub-module 30. At this point, the LC duplex connector 104 can be removed from engagement with the respective transceiver sub-module 30. Thus, it is seen that the release sleeve enables insertion and removal of the LC duplex connector by virtue of its axial position with respect to the LC duplex connector, thereby obviating the need for direct manual manipulation of the LC duplex connector. Each transceiver sub-module of the array system can therefore be connected with an LC or other similar optical fiber connector via respective release sleeves as shown herein. Of course, the release sleeve can be adapted to operate with single or duplex connectors.

The release sleeve can be composed of any suitable material that allows it to function as described above. In one embodiment, the release sleeve is composed of injection molded thermoplastic. In another embodiment, the thermoplastic of the release sleeve further includes a specified percentage of glass fibers intermixed therewith. Alternatively, a variety of other resins can be used.

In addition to the above description, it is appreciated that the release sleeve can be adapted to operate with optical fiber connectors having physical characteristics that vary from that shown here. Moreover, the release sleeve can include designs or features in addition or alternative to those described herein.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An integrated optoelectronic module array, comprising:
    a component structure including a plurality of optoelectronic sub-modules, each of which comprises an optical transceiver module including a receive port associated with a receiving optical subassembly (ROSA) and a transmit port associated with a transmission optical subassembly (TOSA), the component structure being integrally formed such that each optoelectronic sub-module shares at least one wall portion with an adjacent optoelectronic sub-module, wherein the optical sub-modules are disposed belly-to-belly such that the receive ports of adjacent sub-modules are disposed in a row along a length of the component structure and the transmit ports of adjacent sub-modules are disposed in a row along the length of the component structure and adjacent to the row of receive ports; and
    a latching mechanism that enables the component structure to be selectively secured at least partially within an outer cage.

2. An integrated optoelectronic module array as defined in claim 1, wherein the outer cage is affixed to a host board.

3. An integrated optoelectronic module array as defined in claim 2, wherein the host board is contained within an optical device, the optical device being selected from the group consisting of optical switches and optical routers.

4. An integrated optoelectronic module array as defined in claim 2, wherein an optical interface portion of the component structure extends from a first open end of the outer cage, and wherein a plurality of printed circuit board card portions extends from a second open end of the outer cage.

5. An integrated optoelectronic module array as defined in claim 4, wherein the optical interface portion includes at least one optical port for each of the optoelectronic sub-modules.

6. An integrated optoelectronic module array as defined in claim 4, wherein each of the plurality of printed circuit board card portions is received by a respective one of a plurality of connector receptacles connected to the host board.

7. An integrated optoelectronic module array as defined in claim 1, wherein the outer cage provides electromagnetic interference shielding for the optoelectronic sub-modules.

8. An integrated optoelectronic module array as defined in claim 1, further comprising a housing that contains at least a portion of the component structure.

9. An integrated optoelectronic module array as defined in claim 1, wherein the component structure is configured to minimize spacing between the optoelectronic sub-modules.

10. An optical device, comprising:
a first host board having an outer cage affixed thereto;
an integrated optical transceiver array, including:
a component structure at least partially contained within a housing, the component structure including a plurality of optical transceiver sub-modules, the component structure being integrally formed such that each optical transceiver sub-module shares at least one wall portion with an adjacent optical transceiver sub-module, the optical transceiver sub-modules being disposed such that transmit optical ports of the optical transceiver sub-modules are adjacent to transmit optical ports of adjacent optical transceiver sub-modules and receiving optical ports of the optical transceiver sub-modules are adjacent to the receiving optical ports of adjacent optical transceiver sub-modules; and
a latching mechanism that enables the component structure to be selectively secured within the outer cage.

11. An optical device as defined in claim 10, wherein four optical transceiver sub-modules are included in the component structure.

12. An optical device as defined in claim 10, wherein at least one optical fiber connector is selectively connected with at least one of the optical transceiver sub-modules, and wherein a release sleeve is slidably attached to the at least one optical fiber connector.

13. An optical device as defined in claim 10, wherein the latching mechanism is at least partially attached to the component structure and includes:
a rotatable bail; and
a pivot block having a lock pin, the pivot block being pivotally attached to the rotatable bail, wherein the lock pin engages a portion of the outer cage when the bail and the pivot block are positioned in a specified configuration to selectively secure the integrated optical transceiver array.

14. An optical device as defined in claim 10, wherein the outer cage is positioned between the first host board and a second host board.

15. An optical device as defined in claim 10, wherein the optical device includes a plurality of integrated optical transceiver arrays.

16. An optical device as defined in claim 15, wherein two integrated optical transceiver arrays are positioned on opposite surfaces of the first host board, wherein the latching mechanisms of the integrated optical transceiver array each engage the first host board.

17. An integrated optical transceiver module array, comprising:
a housing;
a component structure at least partially contained within the housing, the component structure including a plurality of optical transceiver sub-modules that are integrated into a single structure;
a latching mechanism that selectively engages an outer cage, the outer cage receiving at least a portion of the integrated optical transceiver module array; and
a plurality of optical fiber connectors that are each connected to the optical ports of respective optical transceiver sub-modules, wherein each optical fiber connector includes a release sleeve that is slidably engaged with the optical fiber connector, wherein each release sleeve includes a body defining open first and second ends, wherein a portion of the body further defines a curved inner cam surface.

18. An integrated optical transceiver module array as defined in claim 17, wherein the outer cage is mounted to a host board of an optical device, and wherein the outer cage provides electromagnetic interference shielding for the plurality of optical transceiver sub-modules.

19. An integrated optical transceiver module array as defined in claim 18, wherein each optical transceiver sub-module includes dual optical ports.

20. An integrated optical transceiver module array as defined in claim 19, wherein the component structure includes at least one card-edge connector extending from a rear end of the outer cage, the card-edge connector electrically connecting with a connector receptacle on the host board.

21. An integrated optical transceiver module array as defined in claim 20, wherein the component structure includes four optical transceiver sub-modules.

22. An integrated optical transceiver module array as defined in claim 17, wherein each optical fiber connector is an LC duplex connector having a connector latch for disengaging the LC duplex connector from a respective one of the optical transceiver sub-modules.

23. An integrated optical transceiver module array as defined in claim 22, wherein each release sleeve is shaped to correspond to the exterior shape of the respective LC duplex connector.

24. An integrated optical transceiver module array as defined in claim 17, wherein the release sleeve is selectively slidable between a first position and a second position, and wherein in the second position the curved inner cam surface engages the connector latch of the LC duplex connector to enable it to disengage from the respective one of the optical transceiver sub-modules.

25. An integrated optical transceiver module array as defined in claim 24, wherein the release sleeve is composed of a thermoplastic material.

26. An integrated optoelectronic module array, comprising:
a component structure including a plurality of optical transceiver sub-modules, the plurality of optical transceiver modules being integrated into a single structure; and
a latching mechanism that enables the component structure to be selectively secured at least partially within a cage, the latching mechanism including:
a rotatable bail configured to rotate over a width of the component structure and around only a particular one of the optical transceiver sub-modules and between the particular one of the optical transceiver sub-modules and optical transceiver sub-modules adjacent to the particular one of the optical transceiver sub-modules; and a pivot block.

27. The integrated optoelectronic module array as recited in claim 26, wherein each optical transceiver module shares a structural element with an adjacent optical transceiver module.

28. The integrated optoelectronic module array as recited in claim 27, wherein the shared structural element comprises a wall portion.

29. An integrated optical transceiver module array, comprising:

a housing;

a component structure at least partially contained within the housing, the component structure including a plurality of optical transceiver sub-modules that are integrated into a single structure, each optical transceiver sub-module including dual optical ports;

a latching mechanism that selectively engages an outer cage, the outer cage receiving at least a portion of the integrated optical transceiver module array; and a plurality of optical fiber connectors that are each connected to the optical ports of respective optical transceiver sub-modules, each optical fiber connector including a release sleeve that is slidably engaged with the optical fiber connector, the release sleeve comprising a body defining open first and second ends, a portion of the body further defining a curved inner cam surface, wherein each optical fiber connector comprises an LC duplex connector having a connector latch for disengaging the LC duplex connector from a respective one of the optical transceiver sub-modules, and wherein the release sleeve is selectively slidable between a first position and a second position such that in the second position the curved inner cam surface engages the connector latch of the LC duplex connector to enable the LC duplex connector to disengage from the respective one of the optical transceiver sub-modules.

30. An integrated optical transceiver module array as defined in claim 29 wherein the release sleeve is composed of a thermoplastic material.

* * * * *

UNITED STATES PATENT AND TRADEMARK OFFICE
CERTIFICATE OF CORRECTION

PATENT NO.      : 7,594,766 B1                          Page 1 of 1
APPLICATION NO. : 10/715576
DATED           : September 29, 2009
INVENTOR(S)     : Sasser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Twenty-eighth Day of September, 2010

David J. Kappos
*Director of the United States Patent and Trademark Office*